United States Patent [19]

Dailey et al.

[11] 4,434,432

[45] Feb. 28, 1984

[54] UNIVERSAL IMAGE CODER AND CONTROLLER FOR MULTICOLOR ELECTROLYTIC PRINTING

[75] Inventors: Jack R. Dailey, Endicott; Harry C. Kuntzleman, Newark Valley, both of N.Y.; Charles S. Ng, Charlotte, N.C.; John W. Pike, Endwell, N.Y.

[73] Assignee: International Business Machines Corporation, Armonk, N.Y.

[21] Appl. No.: 391,777

[22] Filed: Jun. 24, 1982

[51] Int. Cl.³ .................................................. G01D 15/06
[52] U.S. Cl. ..................................... 346/154; 346/165
[58] Field of Search ....................... 346/154, 157, 165; 204/2

[56] References Cited

U.S. PATENT DOCUMENTS

| | | | |
|---|---|---|---|
| 3,441,946 | 4/1969 | Rudy | 346/165 |
| 3,553,718 | 1/1971 | Schierhorst et al. | 346/165 |
| 3,613,103 | 10/1971 | Harris | 346/165 |
| 3,654,095 | 4/1972 | Koontz et al. | 204/2 |
| 3,846,801 | 11/1964 | DuMont et al. | 346/165 |

Primary Examiner—Thomas H. Tarcza
Attorney, Agent, or Firm—Saul A. Seinberg

[57] ABSTRACT

Apparatus for locally coding image information and then controlling the delivery of voltage pulses based thereon to the print electrodes of a matrix printer for multicolored image reproduction is described. Control of the print electrode pulses is based on both pulse amplitude and pulse width variations. This concurrent control capability facilitates multicolor printing using a dye matrix that has interleaved dyes which are alternately amplitude and duration sensitive.

The control apparatus, which includes a stacked memory, reads the local image data, which defines a set of pulse profiles for the particular dye matrix used, into the memory. Thereafter, this information is incrementally retrieved by appropriate means and delivered simultaneously to all of the printer's electrodes before any recording medium registration problem becomes discernible. After all memory information is printed, it is reloaded and the new image information is printed. It is possible to vary the bit patterns of the memory retrieval means to effect dynamic changes in the printed result, particularly to achieve gray scale control.

14 Claims, 12 Drawing Figures

UNIVERSAL IMAGE CODER AND CONTROLLER FOR MULTICOLOR ELECTROLYTIC PRINTING

BACKGROUND OF THE INVENTION

1. Field of the Invention

This invention is concerned with apparatus for coding and controlling signal generation at each of a plurality of write electrodes of output devices. More particularly, this invention is directed to a controller for a matrix printer having a large number of output electrodes that must each be separately energized by a unique voltage pulse to produce a visible pixel of predetermined color.

2. Description of the Prior Art

It is well known that printing can be effected on a suitable recording medium using appropriate electrical signals. Depending upon the nature of the recording medium, the printing may be based upon electrochemical, electrothermal, electroerosion or electrolytic phenomena. Regardless of the underlying basis therefor, printing is achieved by applying a continuous or pulsed electrical signal to one or more write electrodes. In the case of pulse based printing, it is known that the pulses may be controlled by causing variations in pulse width or amplitude.

In all printers that utilize electrosensitive recording mediums, it is possible to effect printing by applying a voltage of sufficient amplitude, over a predetermined time period, to the write styli of the particular printer involved. Thus, the ability to "write" on an electrosensitive recording medium is chiefly a function of the amplitude and/or duration of the voltage pulses applied to the print styli or electrodes and of the particular type of recording medium involved. In those printers where the recording medium is moved during printing, the overwhelming majority thereof relies only on electrode amplitude variations to cause printing, since variations in the relative difference between the speed at which the recording medium is moved and the speed at which a write cycle was formerly completed, including the point or points within a write cycle at which a pixel is started and completed, would cause registration errors that adversely affect print quality unless compensated for. Such compensation is either more expensive than the savings afforded by the use of write pulse width control or requires that the recording medium be slowed appreciably or stopped during the printer's write cycle, which would adversely impact its thruput rate.

Except for this registration problem and the cost or performance penalty required to compensate therefor, the time variation method would find widespread favor as it would allow the use of fully saturated devices and also avoid the need to utilize variable drive voltages for the write electrodes. This, in turn, would result in increased operating efficiency, lower power consumption, and reduced heat buildup and dissipation problems. An example of a current utilization of this method will be found in commonly assigned and copending U.S. Pat. application Ser. No. 323,843, which was filed on Nov. 23, 1981 in the names of J. Pawletko et al.

Prior art attempts to utilize time-varied, constant amplitude pulses are known. One such typical prior art arrangement is described in U.S. Pat. No. 3,441,946 which issued to E. Rudy on Apr. 29, 1969. The Rudy circuitry is intended to supply write signals in a single stylus recorder that uses electrosensitive paper. More particularly, this write control circuitry is adapted to vary the frequency of write pulses as a function of the speed at which the recording medium is driven under the print stylus. Thus, the designer is able to compensate for differing recording conditions and speeds and control the degree to which the medium is marked.

U.S. Pat. No. 3,553,718, which issued to A. Schierhorst et al, on Jan. 5, 1971, describes another prior art printer wherein time-based control of a write electrode is employed. In Schierhorst et al, a constant amplitude current pulse is sequentially applied to a plurality of write styli, the duration of said pulse being proportional to the signal to be recorded so that the shading of the recording represents the amplitude of the signal.

U.S. Pat. No. 3,613,103, which was issued to C. Harris on Oct. 12, 1971, is also of interest for its teaching of an electrolytic recorder wherein an analog signal to be recorded is converted to a series of pulses with rises spaced in inverse proportion to the amplitude of the analog signal. Control circuitry therefor is adapted to create this pulse series and thereafter utilize the same to trigger a pulse generator whose output is a corresponding series of constant amplitude write pulses having a spatial density that is proportional to the original signal amplitude.

U.S. Pat. No. 3,846,801, which was granted to H. DuMont et al on Nov. 5, 1974, is yet another typical prior art effort that utilizes time-based printing control. Specifically, DuMont et al describes an arrangement for sequentially activating a multiplicity of juxtaposed writing electrodes. To produce the sequential operation of the write electrodes, a time-division demultiplexer is used to distribute time subdivisions of the signal to the respective electrodes. The DuMont et al control arrangement is further adapted so that the write electrodes are activated for just one pulse each during any one clock period.

It has been demonstrated that multicolor electrolytic printing can be accomplished by the judicious use of an appropriate dye matrix, applied to or incorporated in the surface layer of a recording medium. Each dye in the matrix produces a different color when electrolytically excited by a unique pulse, each of these unique pulses having a different threshold amplitude or width that toggles color, that is, a different excitation profile. Unfortunately, none of the foregoing prior art write electrode control arrangements are suitable for use in an operating environment that requires image coding and control of both amplitude and pulse width regulated write pulses, particularly to achieve multicolored printing. For an example of one prior art effort to electrolytically obtain such printing capability and control means therefor, see U.S. Pat. No. 3,654,095, which was granted to D. Koontz et al on Apr. 4, 1972. Furthermore, none of the prior art devices are readily employable in a matrix printer having a large number of electrodes, on the order of at least several hundred, particularly where the actual printing operation is accomplished with a continuously moving recording medium. Such devices would either cause unacceptable print registration errors or simply not be adaptable to the requirements of current matrix printers that might print multicolored documents by simultaneously energizing a large number of print electrodes with one of several unique write pulses.

OBJECTS AND SUMMARY OF THE INVENTION

Accordingly, it is a principal object of the present invention to provide a universal image coder and print electrode controller that will effectively utilize concurrent pulse amplitude and width control to achieve multicolored printing.

It is also a principal object of the present invention to provide such a control means that minimizes the number of data input and control lines.

It is a further object of the present invention to provide a matrix print electrode controller that can be dynamically altered to effect gray scale changes.

These and other objects of the present invention are achieved by providing code expansion means that will convert information from an external source concerning the desired state of each output node or print electrode into a local code format of k bit words, one word being provided for each node to be controlled. Each local code word is utilized on a group basis, the number of bits in each group being sufficient to identify the amplitude of the pulse to be applied to a particular node and the number of groups per word corresponding to the maximum number of duration increments of a pulse. The expanded code is stored by group in storage means provided for that purpose.

The storage means is scanned by a plurality of scanning registers, one such register being provided for each word bit group. The scan register means are loaded with predefined bit patterns prior to actual scan. Logic circuit means are utilized to compare the state of each cell of the storage means and the bit pattern of each scanning register. The output of the logic circuit means is then forwarded to output node circuit means or drivers that apply the appropriate pulse to each output node. A timing circuit is utilized to control the gating of the coded information into the code expansion and storage means and to sequence the scanning order of the scanning registers.

BRIEF DESCRIPTION OF THE DRAWINGS

The invention will be described further, by way of preferred examples thereof, with reference to the accompanying drawings wherein.

DESCRIPTION OF THE PREFERRED EMBODIMENT

Figure 1:
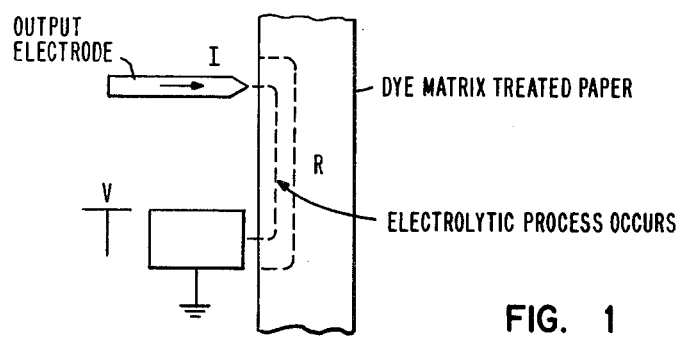
FIG. 1 schematically illustrates a simplified representation of electrolytic printing.

As has been demonstrated in the prior art, electrolytic printing can be accomplished by controlling the voltage or the pulse width of a signal applied to a print electrode 10 in a printer, as is schematically shown in FIG. 1. By injecting an appropriate current (I) into the surface layer 12 of a treated recording medium 14 from electrode 10, visible pixels can be created. It has also been demonstrated that multicolor printing can be achieved if the recording medium treatment involves the use of a suitable dye matrix. The dyes that are utilized in the matrix are each responsive to a particular threshold voltage amplitude or width. In printing, each dye produces a predetermined colored pixel in response to appropriate excitation.

There are, however, significant barriers to the effective utilization of such dye matrices. In particular, it would be difficult, if not impossible, to effectively provide several different excitation voltages for each of hundreds of write electrodes at substantially the same instant using the prior art control apparatus. This suggests that an effective control means need be created in order to first generate the multiple combinations of print pulse amplitude and width that are needed and then apply the correct pulse to each electrode when hundreds of electrodes may be required for high speed printing. Further, due to the fact that there is a limited voltage scale, on the order of ten volts, from which to select excitation voltages in a "low" voltage electrolytic printer, it may be necessary to control electrode voltages on both an amplitude and duration basis, since the amplitude scale might not be large enough to accommodate the several distinct dye minimum and threshold voltages that would be needed. This particular control facility is not found in the prior art.

FIGS. 2a, 2b, 2c and 2d graphically illustrate, by way of example, the print excitation pulse amplitude-width relationships that would be involved and need be accommodated. In these diagrams, the horizontal axis is used to represent time (t), particularly that of pulse width or duration. Each increment on this axis is designated as a "phase"; etc., with phase $1 = t1 - t0$, phase $2 = t2 - t1, \ldots$, etc. The vertical axis of the diagrams is used to represent voltage amplitude, the pulse threshold voltage (V) levels; i.e., V0, V1, V2, V3, ..., etc. This axis can also be used to represent the current levels being employed since $V = IR$ and resistance R is relatively constant.

Figure 2A:
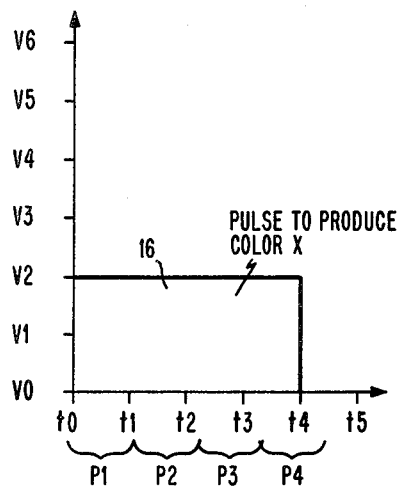
FIGS. 2a, 2b, 2c and 2d graphically depict the relationship between excitation pulse amplitude and duration for several example colors to be printed.
Figure 2B:
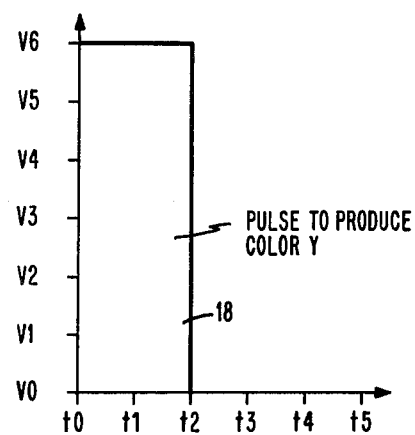
Figure 2C:
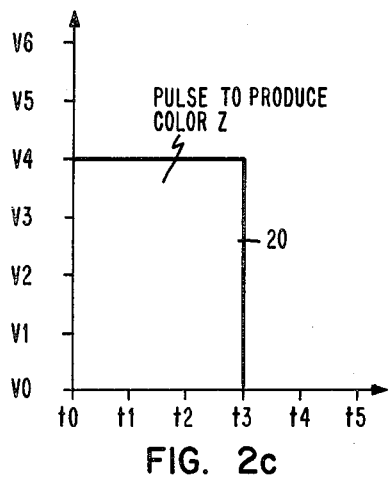

It will be assumed for purposes of this portion of the description, that a three dye system is to be used in a sample matrix. The three dyes x, y and z produce colors X, Y and Z, respectively, when excited by an appropriate write pulse. The first dye x is time sensitive and produces a pixel of color X on the recording medium when properly excited. This means that a pulse of minimum amplitude must be applied for at least the threshold duration of dye x. As shown in FIG. 2a, color X is generated by applying a pulse 16 of voltage amplitude V2 and pulse width t4 to the dye matrix. Dye y is an amplitude sensitive type and will produce a pixel of color Y provided its threshold voltage of V6 is reached or exceeded for its minimum on-time of t2 by pulse 18, as shown in FIG. 2b. Dye z is another time sensitive type that produces, as shown in FIG. 2c, color Z when a pulse 20 of at least duration t3 and amplitude V4 is applied to the dye matrix.

Figure 2D:
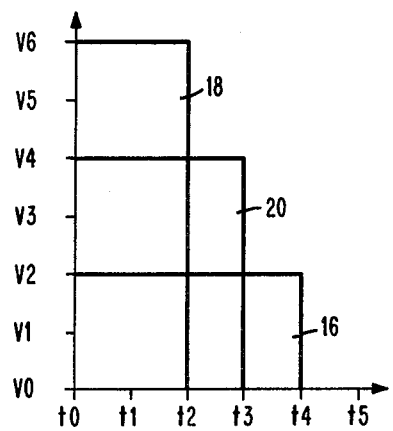

A composite of the three pulses 16, 18 and 20 that produce colors X, Y and Z is shown in FIG. 2d. When pulse 18 for color Y is applied to the dye matrix, it does not trigger either color X or Z since its duration is less than that of pulses 16 and 20, the pulses required for those colors. When pulse 20 for color Z is applied to the dye matrix, it does not trigger either color X or Y since its duration is less than that of pulse 16 required for color X and its amplitude is less than that of pulse 18 required to produce color Y. Similarly, when pulse 16 for color X is applied to the dye matrix, it does not trigger either color Y or Z since its amplitude is less than that of pulses 18 and 20 required, respectively, to produce color Y or color Z. It will be understood from the foregoing that the number of possible printable colors is limited mainly by the ability to fashion a suitable dye matrix and to economically generate and direct appropriate print pulses to the print electrodes. Of course, this must all occur within the time span required to read in, expand and then output the image information to the print electrodes.

Figure 3:
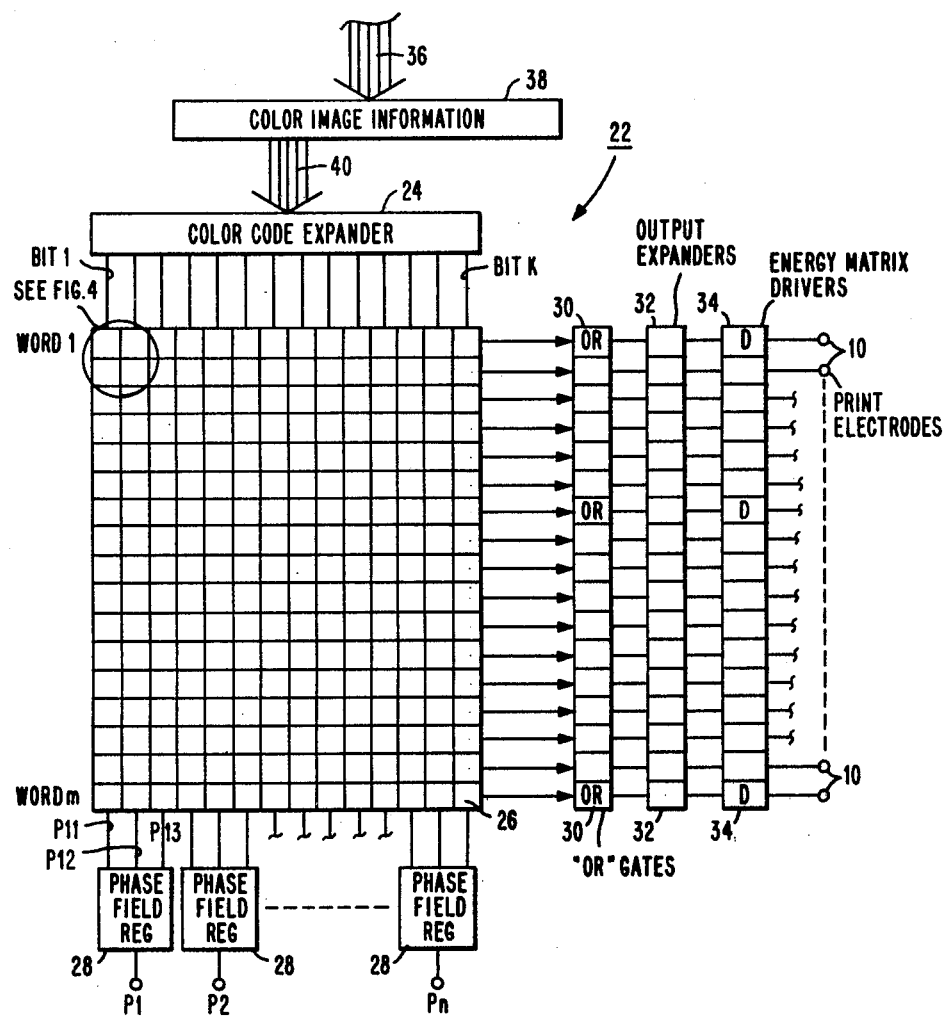
FIG. 3 shows a functional diagram of an image coder and controller that has been implemented in accordance with the present invention.

FIG. 3 illustrates a block diagram of an image coder and print pulse controller 22 that has been implemented in accordance with the present invention. It consists of a color code expander 24, an m×k storage array 26, n phase scan registers 28, "OR" Gates 30, output expanders 32 and print electrode driving circuits 34. In operation, controller 22 functions in the following manner. Initially, color image information is provided to controller 22, via bus 36, from an external source (not shown), usually a host computer. This color image information is stored in buffer 38, which is connected to color code expander 24 by bus 40, and then gated into the color code expander 24 by the system controller system clock (not shown). The color code expander 24 expands the color image information from the external system into a local coding data format. This expansion capability is important since it allows the host storage system to merely retain information that a certain location on the recording medium is to have a particular pixel of a given color imprinted thereupon. The actual code for each pixel, which is longer than this source image information, is derived by and formatted in the color code expander 24 for each print electrode, as shall be hereinafter explained in greater detail.

The newly formatted data is loaded into storage array 26 one full word of k bits at a time, until array 26 is filled or until the system clock is gated off. P1 to Pn are non-overlapping pulses, see FIG. 5, that control the phase scan registers 28. Registers 28 are turned on sequentially to compare the contents of a word group in storage array 26 to the corresponding output lines of the appropriate scan register 28, which have been set by a predefined bit pattern loaded into that scan register. The OR gates 30 are used for dotting the compared results. The output expanders 32 decode the OR gate 30 output signals and expand them into a set of control signals that program the electrode energy matrix drivers 34.

Figure 4:
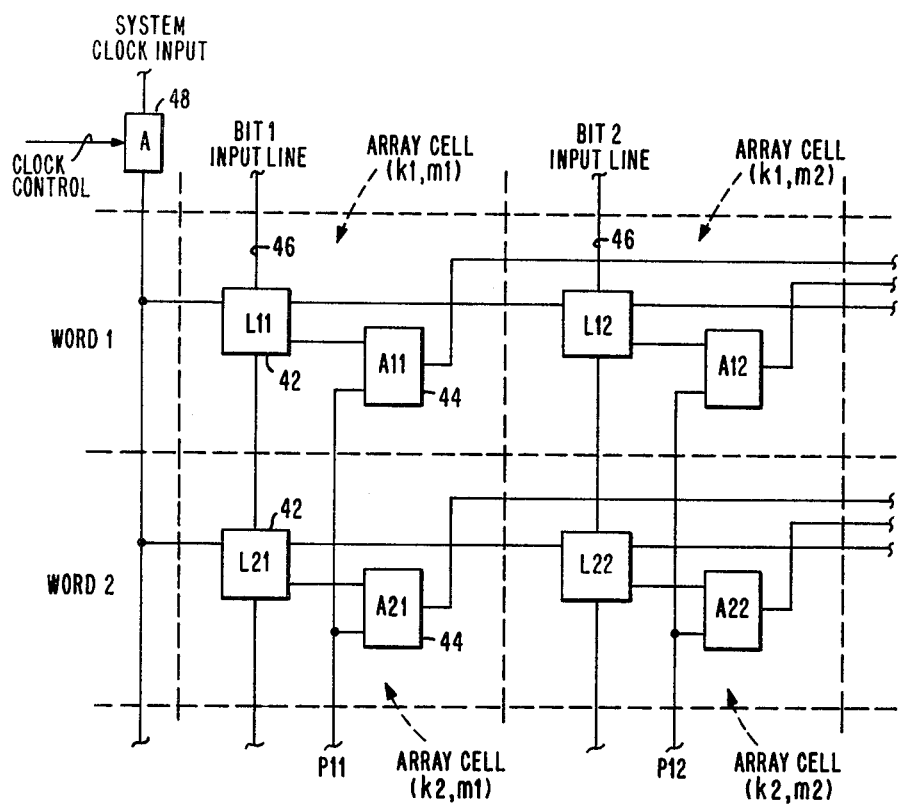
FIG. 4 illustrates the internal arrangement of the storage array included in the FIG. 3 controller.

The storage array 26, as is shown in FIG. 4, consists of a series of latches 42, one each in each cell of the array 26. In addition to the latches 42, each cell includes a logic gate, the AND gates 44. These gates form a logic circuit means that logically compare the output of latches 42 and the phase scan registers 28, as explained hereinafter. Four cells, the first two in words one and two, are illustrated in this Figure. The incoming bit line 46 for each cell, sets the latch therein according to the logical value on that line, for each clock pulse received from the clock control gate 48. Setting each latch also sets one input to its associated AND gate to the same logical value. The cell latches 42 are read out by gating the other input to the AND gates with the phase scan lines for that cell, P11 and P12 in this example.

Figure 5:
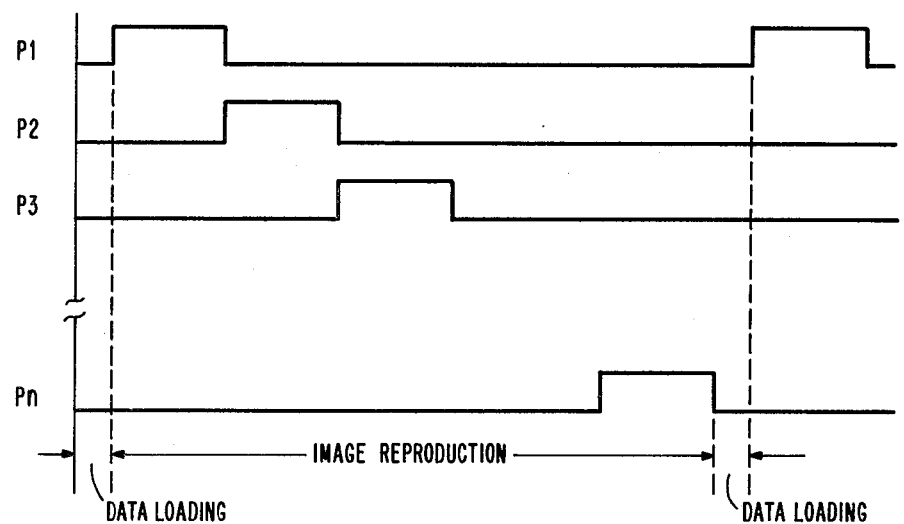
FIG. 5 depicts a timing diagram for the controller of FIG. 3 showing its data loading and image reproduction states.

The general timing aspects and relationships for reading data into and then sequentially scanning it out of storage array 26 are depicted in FIG. 5. The data for each set of pixels is loaded into array 26 at the start of each print cycle and typically takes from two to five microseconds, depending upon the type of host system interface being used, assuming a standard data transmission rate. The image reproduction portion of the print cycle is a function of the number of phases and the speed of the recording medium.

Figure 6:
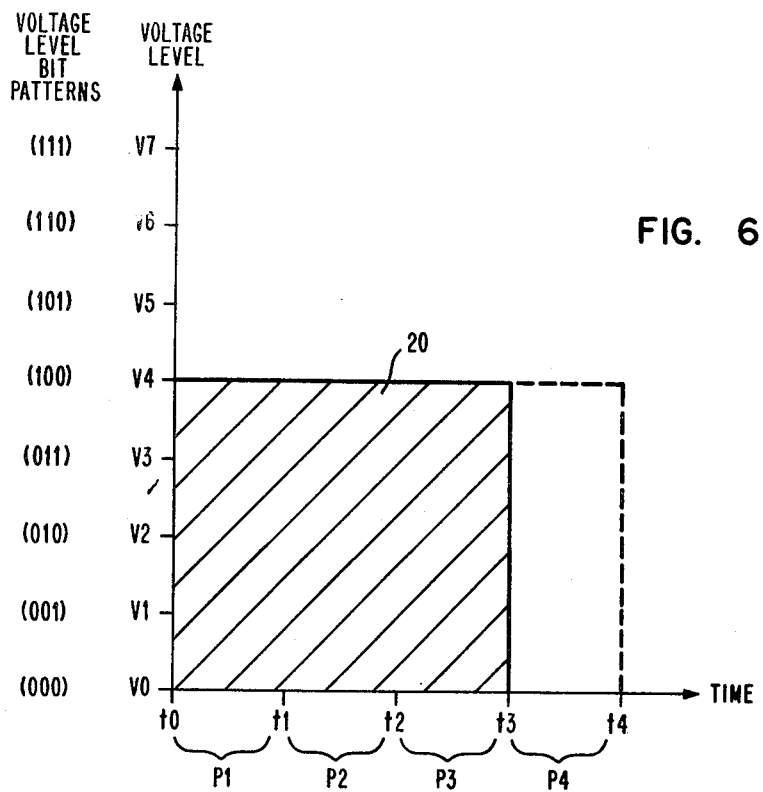
FIG. 6 graphically illustrates the pulse amplitude-width relationship for all phases of the pulse required to print a pixel of predetermined color.

The following example explains the particulars of operation of the present invention, as it would be employed in a typical application. It is assumed that a seven color dye matrix has been used to condition the recording medium surface. As shown in the diagram of FIG. 6, a combination of eight voltage levels, V0 to V7, need be accommodated in order to support a seven color plus background print output capability. The bit pattern corresponding to each voltage level is parenthetically shown alongside the voltage levels on the diagram's vertical axis. As also shown in this diagram, this support has to extend over the expected time range, in this instance, four scan or time increments, P1 to P4. The control system should also be capable of simultaneously controlling at least 256 electrode drivers, the number needed to print at least 256 picture elements per inch (pixels) effectively.

It will require a minimum of three bits of coded source image information to represent the necessary eight voltage levels and thereby exercise full seven color and background control over each electrode. Although many coding schemes will work, a code of '000' has been assigned for the background, that is, no color is to be printed, and a code of '001' has been assigned for the color yellow, an example color whose voltage profile 20 is given in the FIG. 6 diagram. The remaining possible three bit codes would be assigned to the six remaining colors. Each word location of storage array 26 is logically divided into and handled as a predetermined number of fields that corresponds to the number of pulse duration increments, in this case four, P1 to P4. Each field consists of as many bits of data as it will take to represent one of the required voltage levels, in this instance three bits of data for any one of the eight voltages V0 to V7.

Figure 7:
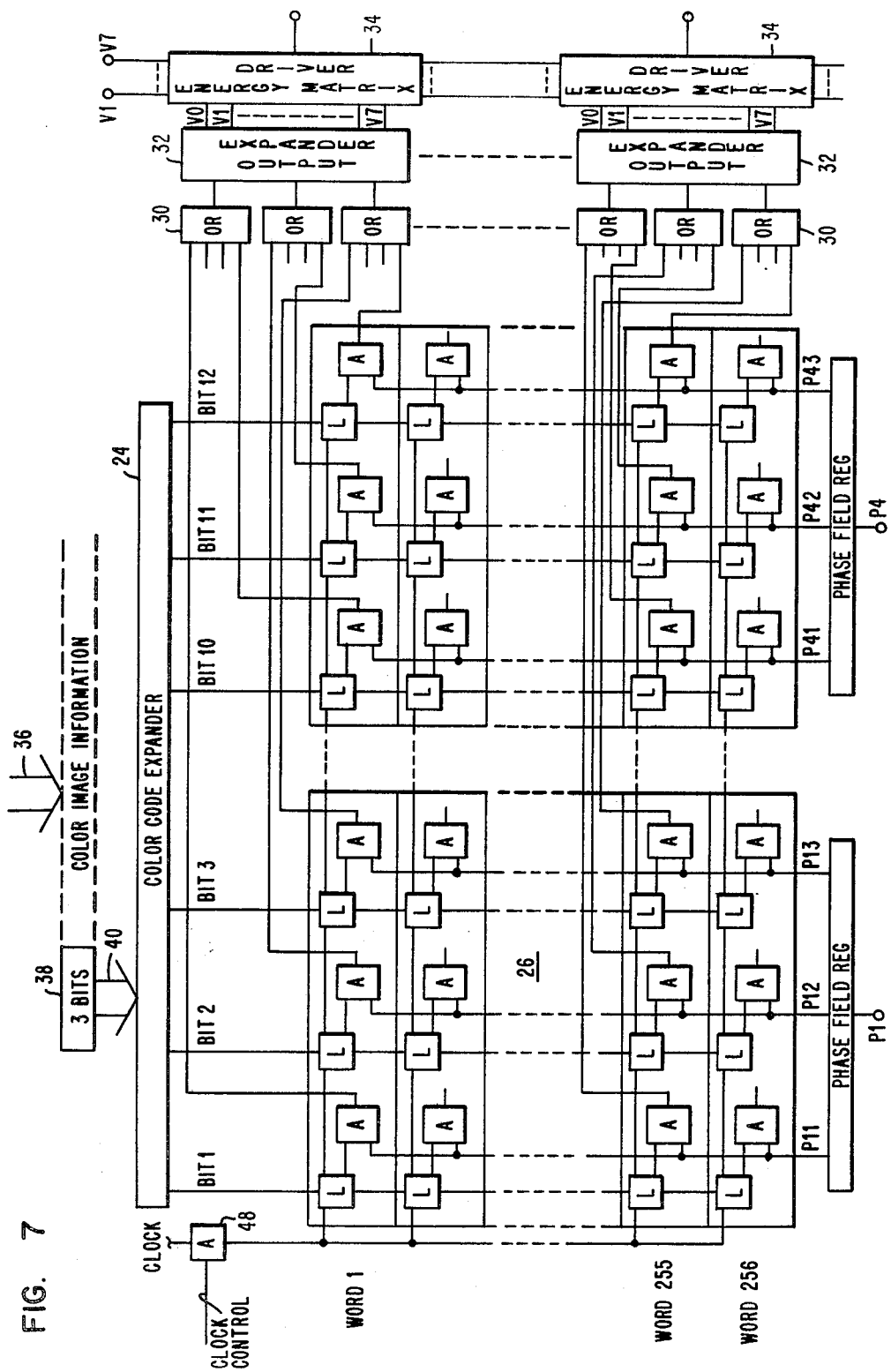
FIG. 7 schematically illustrates a controller that has been adapted, in accordance with the present invention, to control printing using a seven color dye matrix.

FIG. 7 schematically illustrates the main operational control flow for a seven color dye matrix printing controller. During the data loading cycle, color image information from the host system is expanded into twelve bit words of local code, in four scan groups or fields of three bits each, by the color code expander 24. This local code is then shifted into storage array 26, one full word at a time, until array 26 is filled or the clock is gated off by AND gate 48. There will be one word of local code supplied for each electrode that is used. Thus, array 26 will be at least twelve bits wide and 256 words deep for this example. Assuming that a yellow colored pixel is to be produced by pulse 20 at output electrode 10-1, the host will forward the code '001' to controller 22, where it is expanded into a local control word by code expander 24. This corresponding control word, which is loaded into storage array 26, will be '100 100 100 000', a representation of voltage levels V4, V4, V4 and V0 for the time increments P1, P2, P2 and P4, respectively, in conformity with the pulse profile shown in FIG. 6.

Figure 9:
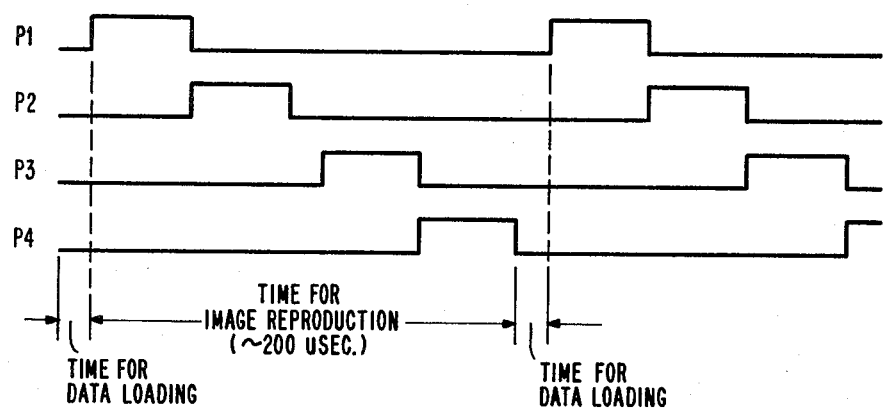
FIG. 9 shows a timing diagram for the controller of FIG. 7 that depicts the data loading and image reproduction states thereof.
Figure 8:
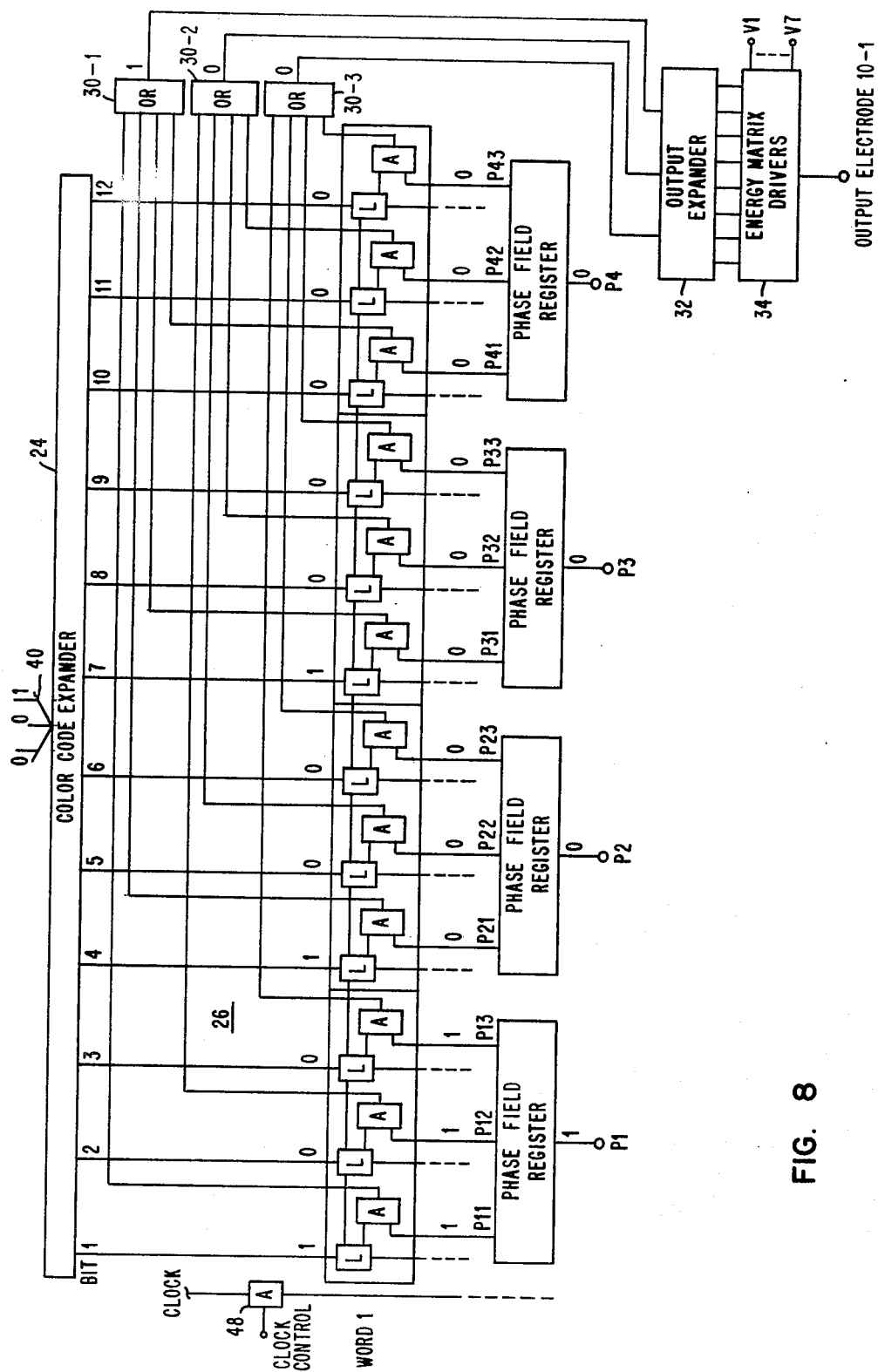
FIG. 8 schematically depicts the utilization of the FIG. 6 pulse profile in the FIG. 7 controller to cause proper voltage application to one of the print electrodes.

This condition is schematically illustrated in FIG. 8, wherein the proper control word for a yellow colored pixel is shown as having been loaded into the first word location of storage array 26. The first scan register P1 has been turned on, the other scan registers are turned off, and only scan lines P11, P12 and P13 are set to logical "1"s, to thereby read out the data in the first field of word one. Since the latch 42-1 determined input to AND gate 44-1 is "1" for this example, setting its other input line P11 to a logical "1" brings the output of AND gate 44-1 to a logical "1". In a similar manner, the inputs to AND gates 44-2 and 44-3 from latches 42-2 and 42-3 and lines P12 and P13 set the output of AND gate 44-2 to a logical "0" and the output of AND gate 44-3 to a logical "0". OR gates 30-1, 30-2 and 30-3 receive the output, respectively, of AND gates 44-1, 44-2 and 44-3. These outputs are dotted by each OR gate and thereby have their outputs set in accordance therewith. Thus, the output of OR gate 30-1 is set to a logical "1", the output of OR gate 30-2 is set to a logical "0" and the output of OR gate 30-3 is set to a logical "0" by the first duration scanning action. An overall timing diagram of the data loading and image reproduction for this seven color controller 22 is shown in FIG. 9. For this example, as noted therein, the data loading portion of the entire print cycle takes about two to five microseconds, depending upon the type of interface used, while the image reproduction portion of the print cycle takes approximately two hundred microseconds.

Output expander 32 is connected to the output of the OR gates 30-1, 30-2 and 30-3. It is adapted to decode the bit pattern, in this instance '100', present at its input and to activate the voltage line V4 corresponding thereto. This will force the print electrode energy matrix driver 34 to set its output voltage to the amplitude represented by V4, the required voltage for the first time increment of the FIG. 6 example pulse. In a similar manner, when P1 goes down and P2 comes up, P3 and P4 remaining down, another '100' bit pattern will be produced at the outputs of the three "OR" gates 30-1, 30-2 and 30-3 as scan lines P21, P22 and P23 are set to logical "1"s. This bit group will then be decoded by the output expander 32 and activate its V4 line for appropriate electrode output. This scanning activity will continue through phases P3 and P4, first setting scan lines P31, P32 and P33 to logical "1"s and then scan lines P41, P42 and P43, to provide the print electrode 10-1 with the remainder of the pulse profile 20 shown in FIG. 6. That pulse profile was completed by scanning array 26 during phases 3 and 4 to present voltage level V4 to electrode 10-1 during scanning phase 3 and voltage level V0 during scanning phase 4. The above-described sequence occurs simultaneously for the other 255 output drivers to create the color pixel or background that each driver has been programmed to produce.

By releasing the clock control 48 after the array has been completely scanned, a new set of local coded image information can be loaded in storage. However, by inhibiting the release of clock control 48, it is possible to repeat the same image at every output without having to reload data. To further enhance system flexibility and power, the information in each of the phase field registers 28 could be pre-set to bit combinations other than all "1"s, for the example given, or all "0"s in the case of negative logic. This would enable selection and masking of array columns within a given phase to yield a variable scan field length that would be useful, for example, in providing dynamic gray scale control or hue gradation. Thus, for example, if a yellow pixel were to be printed and it were desired to print it darker than normal, the same word for yellow would be stored in the memory array 26 with its last three bits set to logical "1"s and the phase line bit pattern for phase 4 altered to provide whatever voltage level would be appropriate for that last printing increment. It would thereby be possible to print a normal yellow final increment by using a phase 4 bit pattern of '000', as was done in the example above, or a darker yellow pixel by using a '010' bit pattern in phase 4 for this duration sensitive dye.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. Apparatus for controlling a plurality of output nodes by selectively providing at each output node, one of a number of predetermined unique pulses in response to the receipt of information from an external source defining the desired state of each output node at a particular instant of time, each of said pulses being one in an matrix thereof, said matrix having a predetermined number of amplitude and duration increments, said control apparatus comprising:
   (a) bus means, connected to receive the output of said source, for conveying input information on the desired state of said output nodes from said source to said control apparatus;
   (b) code expansion means, connected to said bus means, for expanding information received from said bus means into a local format of m coded words of k bits each, there being one such word for each output node, each of said words being formed of bit groups, one group for each of said pulse duration increments, said bits of each group defining any one of said pulse amplitude increments;
   (c) storage means having a plurality of accessible cells, connected to said code expansion means, for receiving and storing therein all of said coded words, one bit of each word per cell;
   (d) a plurality of scanning register means, one for each duration increment of said pulses, each having a predefined bit pattern stored therein and connected, respectively, one to each and the same group of storage means cells for each of said words stored therein, for scanning said storage means cells with said predefined bit pattern;
   (e) logic circuit means connected to receive the output of said storage means cells for logically comparing the bits stored therein to said bit patterns of said scanning register means and for producing an output that is a logical combination of each storage cell bit and the corresponding bit of said predefined scanning register bit pattern;

(f) output node circuit means, connected between said logic circuit means and said output nodes, for receiving the output of said logic circuit means and for responsively converting said output to the appropriate amplitude increment for each of said output nodes; and (g) timing circuit means connected to said bus means, said code expansion means, said storage means and said scanning register means for causing said bus means to shift said external source information into said code expansion means, for causing said expanded local coded words to be shifted from said code expansion means to said storage means and for causing said scanning register means to sequentially scan, by group, said cells of said storage means with which they are associated.

2. The apparatus according to claim 1 wherein said output nodes are the print electrodes of a dot matrix printer and wherein each bit of said predefined bit pattern stored in each of said scanning registers is logically defined in accordance with the desired intensity to be produced by its associated and controlled electrodes.

3. The apparatus according to claim 1 wherein each bit of said predefined bit pattern stored in each of said scanning registers is logically the same.

4. The apparatus according to claim 3 wherein each bit of said predefined bit pattern stored in each of said scanning registers is logically defined in accordance with the desired effective duration of each duration interval.

5. The apparatus according to claim 4 wherein said output nodes are the print electrodes of a dot matrix printer and wherein each bit of said predefined bit pattern stored in each of said scanning registers is logically defined in accordance with the desired intensity to be produced by its associated and controlled electrodes.

6. The apparatus according to claim 5 wherein said output node circuit means includes further code expansion means, connected to the output of said logic circuit means, for expanding the logical output thereof into the proper pulse amplitude for each duration increment for each of said output nodes.

7. The apparatus according to claim 1 wherein said output node circuit means includes further code expansion means, connected to the output of said logic circuit means, for expanding the logical output thereof into the proper pulse amplitude for each duration increment for each of said output nodes.

8. The apparatus according to claim 7 wherein said output nodes are the print electrodes of a dot matrix printer and wherein each bit of said predefined bit pattern stored in each of said scanning registers is logically defined in accordance with the desired intensity to be produced by its associated and controlled electrodes.

9. Apparatus for controlling a plurality of print electrodes for purposes of dot matrix color printing therewith on the treated surface of a recording medium, said surface including a plurality of dyes, each dye being responsive to one of a set of unique pulses of predetermined amplitude and duration when applied to any of said print electrodes, said pulses having no more than a predetermined maximum number of amplitude and duration increments with information defining the desired voltage state of each print electrode at a particular instant of time being available from an external source, said control apparatus comprising:

(a) bus means, connected to receive the output of said source, for conveying input information on the desired state of said print electrodes from said source to said control apparatus;

(b) code expansion means, connected to said bus means, for expanding information received from said bus means into a local format of m coded words of k bits each, there being one such word for each print electrode, each of said words being formed of bit groups, one group for each of said possible pulse duration increments, said bits of each group being sufficient in number to define all of said pulse amplitude increments;

(c) storage means having a plurality of accessible cells, connected to said code expansion means, for receiving and storing therein all of said coded words, one bit of each word per cell;

(d) a plurality of scanning register means, one for each duration increment of said pulses, each having a predefined bit pattern stored therein and connected, respectively, one to each and the same group of storage means cells for each of said words stored therein, for scanning said storage means cells with said predefined bit pattern;

(e) logic circuit means connected to receive the output of said storage means cells for logically comparing the bits stored therein to said bit patterns of said scanning register means and for producing an output that is a logical combination of each storage cell bit and the corresponding bit of said predefined scanning register bit pattern;

(f) electrode driver circuit means, connected between said logic circuit means and said print electrodes, for receiving the output of said logic circuit means and for responsively converting said output to the appropriate amplitude increment for each of said print electrodes; and (g) timing circuit means connected to said bus means, said code expansion means, said storage means and said scanning register means for causing said bus means to shift said external source information into said code expansion means, for causing said expanded local coded words to be shifted from said code expansion means to said storage means and for causing said scanning register means to sequentially scan, by group, said cells of said storage means with which they are associated.

10. The apparatus according to claim 9 wherein each bit of said predefined bit pattern stored in each of said scanning registers is logically defined in accordance with the desired intensity to be produced by its associated and controlled electrodes.

11. The apparatus according to claim 9 wherein each bit of said predefined bit pattern stored in each of said scanning registers is logically the same.

12. The apparatus according to claim 9 wherein each bit of said predefined bit pattern stored in each of said scanning registers is logically defined in accordance with the desired effective duration of each duration interval.

13. The apparatus according to claim 9 wherein said electrode driver circuit means includes further code expansion means, connected to the output of said logic circuit means, for expanding the logical output thereof into the proper pulse amplitude for each duration increment for each of said print electrodes.

14. The apparatus according to claim 13 wherein said electrode driver circuit means includes further code expansion means, connected to the output of said logic circuit means, for expanding the logical output thereof into the proper pulse amplitude for each duration increment for each of said print electrodes.

* * * * *